United States Patent
Ito et al.

(10) Patent No.: US 7,745,956 B2
(45) Date of Patent: Jun. 29, 2010

(54) GRID INTERCONNECTION DEVICE, GRID INTERCONNECTION SYSTEM AND TRANSFER TRIP SYSTEM

(75) Inventors: Kazuo Ito, Hirakata (JP); Wataru Horio, Kobe (JP); Masahiro Makino, Nara (JP); Ryuzo Hagihara, Kobe (JP); Haruhiko Tatsumi, Ibaraki (JP); Takeo Ishida, Gunma (JP); Osamu Tajima, Sanda (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 420 days.

(21) Appl. No.: 11/928,005

(22) Filed: Oct. 30, 2007

(65) Prior Publication Data

US 2008/0100145 A1    May 1, 2008

(30) Foreign Application Priority Data

Oct. 31, 2006    (JP)    .............................. 2006-297075

(51) Int. Cl.
*H02J 3/00* (2006.01)
*H02H 3/00* (2006.01)
(52) U.S. Cl. .......................................... 307/86; 361/62
(58) Field of Classification Search .................. 307/86; 361/62
See application file for complete search history.

(56) References Cited

U.S. PATENT DOCUMENTS

| 6,429,546 B1 * | 8/2002 | Ropp et al. | 307/31 |
| 6,801,442 B2 * | 10/2004 | Suzui et al. | 363/55 |
| 2008/0179966 A1 * | 7/2008 | Horio et al. | 307/126 |

FOREIGN PATENT DOCUMENTS

| JP | 06-153404 | 5/1994 |
| JP | 08-019183 | 1/1996 |
| JP | 2005-198446 | 7/2005 |

* cited by examiner

*Primary Examiner*—Ronald W Leja
(74) *Attorney, Agent, or Firm*—Marvin A. Motsenbocker; Mots Law, PLLC

(57) ABSTRACT

A grid interconnection device includes a relay controller configured to control separation or interconnection of a relay; a receiver configured to receive, from a predetermined transmission path, power failure information containing at least local area information indicating an area in which a power failure occurs; a determination unit configured to determine an occurrence of a power failure in a power distribution system, when the power failure information includes local area information of an area to which the power distribution system belongs; and a detector configured to detect an islanding state. The detector increases detection sensitivity of the islanding state when the determination unit determines the power failure in the power distribution system. The relay controller performs separation control for the relay when the islanding state is detected by the detector.

5 Claims, 8 Drawing Sheets

FREQUENCY
SHIFT AMOUNT

GRID INTERCONNECTION DEVICE, GRID INTERCONNECTION SYSTEM AND TRANSFER TRIP SYSTEM

CROSS REFERENCE TO RELATED APPLICATION

This application is based upon and claims the benefit of priority from prior Japanese Patent Application No. 2006-297075, filed on Oct. 31, 2006; the entire contents of which are incorporated herein by reference.

BACKGROUND OF THE INVENTION

1. Field of the Invention

The present invention relates to a grid interconnection device and a grid interconnection system which includes a power conversion circuit for converting power from a power generation device into predetermined alternating-power, and which connects the power generation device to a power distribution system through the power conversion circuit and a relay.

2. Description of the Related Art

Conventionally, there has been known a system, as shown in FIG. 1, in which a plurality of power distribution systems (banks) are arranged under a power distributing substation 20, and in which a large number of customers 100a to 100c are connected in parallel to a bank 1. Specifically, each of the customers 100a to 100c includes a grid interconnection system having a power generation device and a grid interconnection device which connects the power generation device to the power distribution system. In such a grid interconnection system, when power supply to a predetermined customer (for example, the customer 100a) from the power distributing substation 20 is stopped, processing of separating the power generation device in the predetermined customer from the power distribution system is performed. However, in rare cases, disruption of power supply from the power distribution system cannot be detected and thus the separation processing is not performed. The above described state, in which the power supply from the power distributing substation 20 is stopped while the power is supplied by the power generation device in the customer 100a, is called as an islanding state. As a method for detecting the islanding state, there are a passive islanding detection method and an active islanding detection method.

The former method is a method for detecting the islanding state by using a variation in the power distribution system caused when the power supply from the power distribution system is stopped, for example, a phase change (phase jump phenomenon) in a voltage of the power distribution system, a frequency change, a voltage change and the like. Meanwhile, the latter method is a method for detecting the islanding state by applying disturbance, for example, an active variation such as a frequency variation, a phase variation, a voltage variation and a load variation, to an output of the grid interconnection system in the customer, and by using a variation in the power of the power distribution system according to the disturbance. Since the two methods have different characteristics, the interconnection guideline in Japan specifies simultaneous use of the two methods to increase power failure detection accuracy. A power failure can be normally detected in most cases by use of the above methods. However, complete detection cannot be achieved.

In consideration of the circumstances as described above, there has been proposed a transfer trip method for separating a power generation device from a system by transmitting a power failure signal in a power distribution system, which is notified from a power distributing substation, to a grid interconnection system by use of transmission means.

According to one related art, a transfer main device is provided in a power distributing substation and a transfer sub-device is provided in a grid interconnection system in a customer. By using a power line connecting the main device to the sub-device, a carrier is constantly transmitted from the transfer main device and is received by the transfer sub-device. When the carrier no longer reaches the transfer sub-device, a power receiving relay is cut off to prevent an islanding state in the grid interconnection system in the customer.

According to another related art, positions of respective power generation devices and state information of switches in a system are obtained and stored. Based on the stored information, it is individually identified under which distribution lines in which power distributing substations the respective power generation devices are located. When an accident happens in the system, a transfer trip signal is selectively transmitted only to the power generation device which is targeted for transfer trip, based on the above identification. As described above, in the another related art, since a destination is specified and power failure information is transmitted thereto, the transfer trip target can be set to the minimum.

SUMMARY OF THE INVENTION

As a first aspect of the present invention, a grid interconnection device includes a power conversion circuit for converting power from a power generation device into predetermined alternating-power and connects the power generation device to a power distribution system through the power conversion circuit and a relay. The grid interconnection device includes: a relay controller configured to control separation or interconnection of the relay; a receiver configured to receive, from a predetermined transmission path, power failure information containing at least local area information indicating an area in which a power failure occurs; a determination unit configured to determine an occurrence of a power failure in the power distribution system, when the power failure information includes local area information of an area to which the power distribution system belongs; and a detector configured to detect an islanding state. The detector increases detection sensitivity of the islanding state when the determination unit determines the power failure occurs in the power distribution system. The relay controller performs separation control for the relay when the islanding state is detected by the detector.

In the grid interconnection device according to the first aspect, the detector may increase the detection sensitivity by lowering a detection threshold.

The grid interconnection device according to the first aspect further includes an output controller configured to change an output state of power outputted from an inverter circuit. The output controller may increase the detection sensitivity by increasing an active variation amount.

In the grid interconnection device according to the first aspect, the detector includes a first detector configured to detect the islanding state and a second detector configured to detect the islanding state by use of an islanding detection method different from that used by the first detector. Thus, the detection sensitivity may be increased by using the second detector in addition to the first detector to detect the islanding state.

In the grid interconnection device according to the first aspect, if the detector increases the detection sensitivity, the detection sensitivity may be set back to that before being increased after a lapse of predetermined time.

In the grid interconnection device according to the first aspect, the predetermined transmission path is formed of a plurality of transmission paths, the receiver receives the power failure information through each of the plurality of transmission paths, and the determination unit may determine whether or not the power failure occurs in the power distribution system, on the basis of the power failure information received from each of the plurality of transmission paths.

In the grid interconnection device according to the first aspect, the receiver may make a request to a source of the power failure information for information concerning the power failure information.

As a second aspect of the present invention, a grid interconnection system includes a power generation device and the grid interconnection device described above.

As a third aspect of the present invention, a transfer trip system includes a power distributing substation and a grid interconnection system, which are connected to each other through a power distribution system. The power distributing substation has a transmitter configured to transmit to the grid interconnection system, through a predetermined transmission path, power failure information containing at least local area information indicating an area in which a power failure occurs. The grid interconnection system includes a power generation device configured to generate power; a power conversion circuit configured to convert the power from the power generation device into predetermined alternating-power; a relay configured to switch between separation and interconnection of the power generation device to and from the power distribution system; a relay controller configured to control separation or interconnection of the relay; a receiver configured to receive, from the predetermined transmission path, the power failure information; a determination unit configured to determine an occurrence of a power failure in the power distribution system, when the power failure information includes local area information of an area to which the power distribution system belongs; and a detector configured to detect an islanding state. The detector increases detection sensitivity of the islanding state when the determination unit determines the power failure occurs in the power distribution system. The relay controller performs separation control for the relay when the islanding state is detected by the detector.

DETAILED DESCRIPTION OF THE EMBODIMENTS

Figure 1:
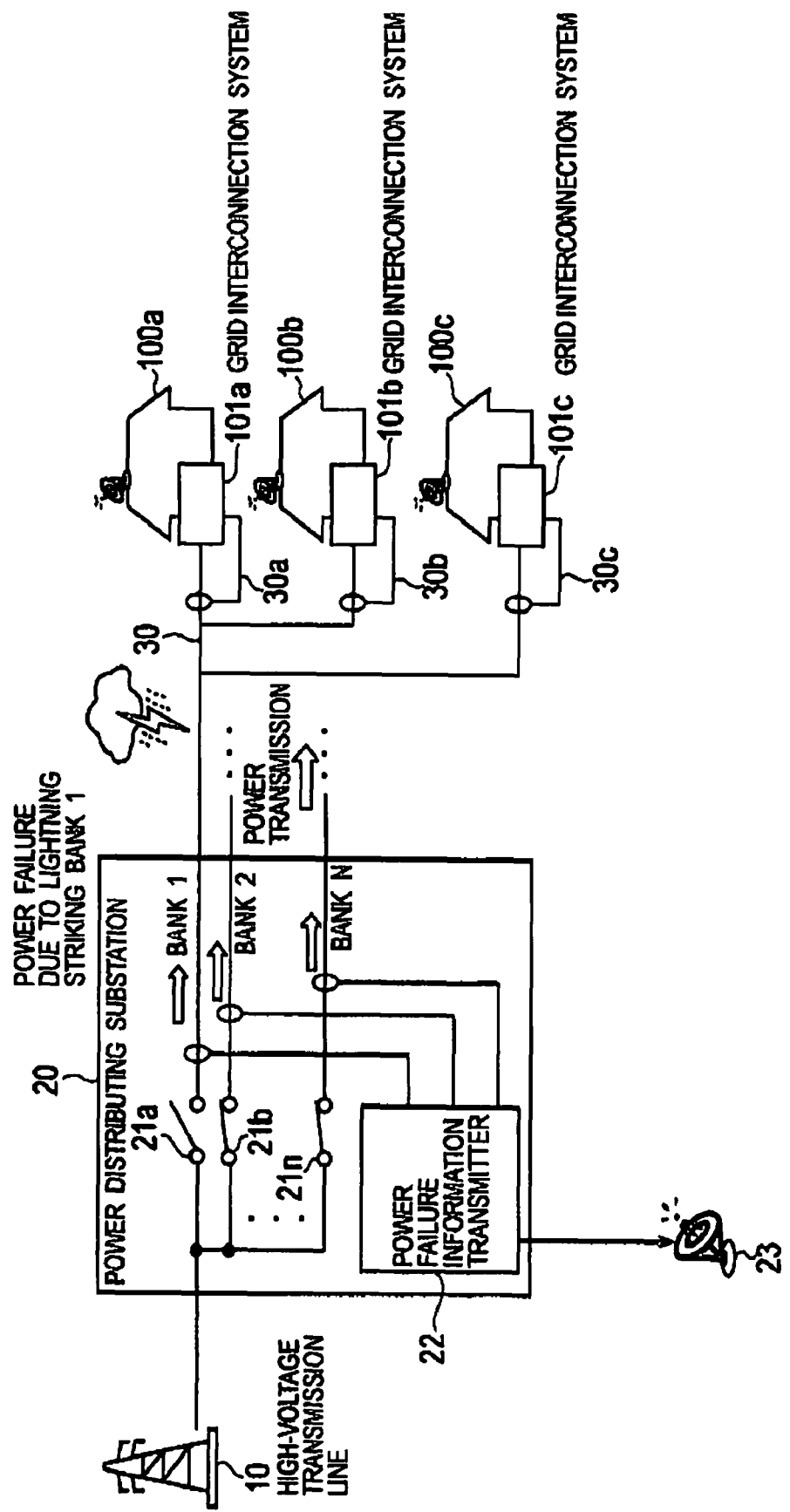
FIG. 1 is a block diagram showing a transfer trip system for a power generation device according to an embodiment of the present invention.

Next, with reference to the drawings, embodiments of the present invention will be described. Note that, in the following description of the drawings, the same or similar parts will be denoted by the same or similar reference numerals. However, it should be noted that the drawings are conceptual.

(Transfer Trip System for Power Generation Device)

As shown in FIG. 1, a transfer trip system for power generation device according to this embodiment includes a high-voltage transmission line 10, a power distributing substation 20 and customers 100a to 100c having power generation devices. A plurality of power distribution systems (banks) are provided under the power distributing substation 20, and a large number of customers 100a to 100c are connected in parallel to the bank 1. Moreover, in the customers 100a to 100c, grid interconnection systems 101a to 101c including the power generation devices are provided, respectively. The grid interconnection systems 101a to 101c are, for example, power generation systems such as a photovoltaic power system, a fuel cell power system and a wind power system.

The customers 100a to 100c use power supplied from the power distributing substation 20 and supplies power generated by the power generation devices in the grid interconnection systems 101a to 101c to a load on the same power distribution system through interconnection thereto (not shown). Here, FIG. 1 shows an example when the bank 1 in the power distributing substation 20 is struck by lightning and a power failure occurs in the bank 1. In this case, the grid interconnection system 101a detects an islanding state resulting from disruption of power supply to the customer 100a from the power distributing substation 20, and separates off the power generation device from the power distribution system. Here, an interconnection state means a state where the power generation device in the customer 100a is electrically connected to the power system under the power distributing substation 20. Further, the islanding state means a state where the power supply from the power distributing substation 20 is stopped and the power is supplied from the grid interconnection system in the customer 100a. As a method for detecting such an islanding state, there is a passive or active islanding detection method (to be described in detail later). However, in the islanding state, when the load in the power distribution system is matched with an output from the power generation device, it may become difficult for the grid interconnection systems 101a to 101c to detect the islanding state. In this embodiment, power failure in such a case is detected.

When the power failure occurs in the bank 1, the power distributing substation 20 cuts off (releases) a relay 21a in the bank 1, and a power failure information transmitter 22 simultaneously transmits power failure information to an unspecified number of grid interconnection systems. The customers 100a to 100c receive the power failure information simultaneously transmitted by the power failure information transmitter 22. Moreover, in this event, the power failure information transmitter 22 uses a plurality of transmission paths to transmit the power failure information. For example, the power failure information transmitter 22 performs simultaneous wireless transmission (broadcast transmission) through an antenna 23, simultaneous wired transmission using a modem or the like instead of the antenna 23, and the like. As the simultaneous wireless transmission, for example, data broadcasting such as terrestrial digital broadcasting, analog TV (Tele Vision), BS (Broadcasting Satellite), CS (Communication Satellite), radio, wave clock information, satellite communication, the Internet and the like are used. Meanwhile, as the simultaneous wired transmission, wire broadcasting by broadcast facilities, providers and the like, CATV (Cable Tele Vision), the Internet, power line communication and the like are used. Moreover, in the case of using the digital broadcasting, TV, radio, wire broadcasting and the like, the power failure information may be broadcasted by transmitting distribution data to broadcast stations as disaster information (provided by lifeline organizations) or regional information. Moreover, in the case of using the wave clock information, the power failure information may be added to wave clock data and transmitted.

Furthermore, the power failure information contains operation information indicating presence or absence of a power failure state and local area information. The local area information includes, for example, information of an area (for example, Hirakata area) suffering from the power failure, information of a company (for example, XX Electric Power) having jurisdiction over the area, grid information (for example, the bank 1) indicating the power distribution system suffering from the power failure, and the like. The power failure information may be transmitted only when the power failure occurs or may be periodically transmitted. Moreover, as the power failure information, not only a character string such as a name of the area but also a control number or the like may be transmitted by attaching the control number to the name of the area.

Note that the operation information contained in the power failure information enables notification of not only the power failure state but also a recovery state where the power failure is restored. Moreover, the operation information enables control of interconnection to or separation from the system.

(Grid Interconnection System)

Next, the customers 100 and the grid interconnection systems 101 will be described in detail. Note that, although description will be given below of the customer 100a as an example, the customers 100b and 100c also have the same configuration.

The customer 100a includes the grid interconnection system 101, an antenna 170 and general home appliances 150a to 150c. Moreover, the customer 100a may include a modem or the like instead of the antenna 170 or may include the antenna and the modem.

The antenna 170 receives wirelessly distributed power failure information. (In the case of power failure information distributed through wired transmission, the modem or the like is used instead of the antenna 170.) The general home appliances 150a to 150c are loads in the customer 100a. Note that all equipment, devices and the like that consume power correspond to the loads and the loads do not apply to only the general home appliances.

Moreover, the grid interconnection system 101 includes a power generation device 110, a grid interconnection device 120 and a relay 180. The power generation device 110 is a power generation device such as a solar cell, a fuel cell, a wind power generator and an engine generator. The relay 130 separates or interconnects wiring between the grid interconnection system 101a and the bank 1.

Figure 3:
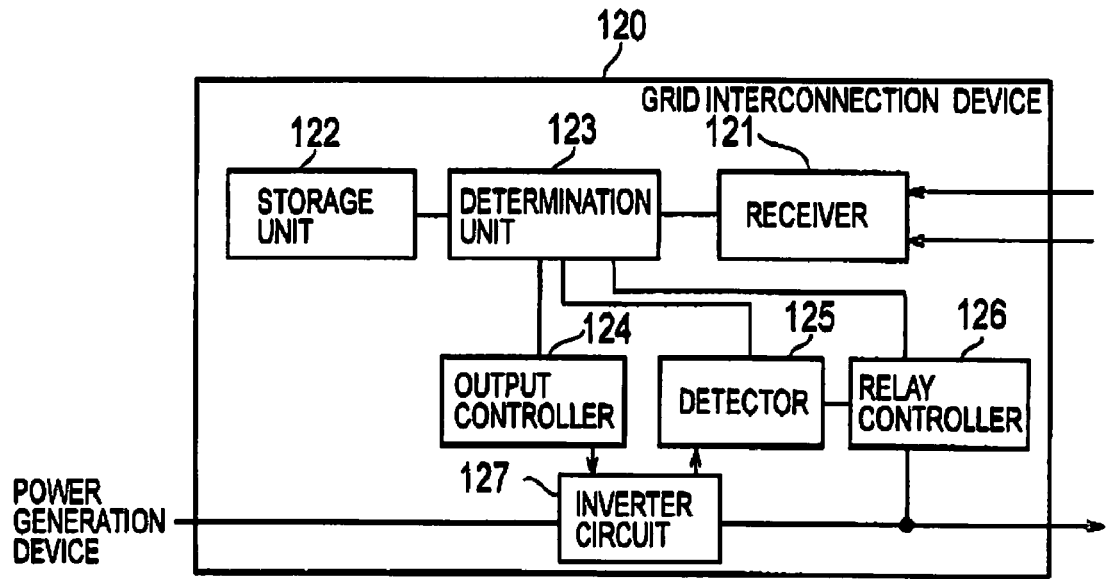
FIG. 3 is a functional block diagram showing a grid interconnection device according to the embodiment.

As shown in FIG. 3, the grid interconnection device 120 includes a receiver 121, a storage unit 122, a determination unit 123, an output controller 124, a detector 125, a relay controller 126 and an inverter circuit 127 as a power conversion circuit. The grid interconnection device 120 interconnects the power generation device to the bank 1 through the inverter circuit 127 and the relay 130.

The inverter circuit 127 is configured to convert the power from the power generation device into alternating-power.

Figure 2:
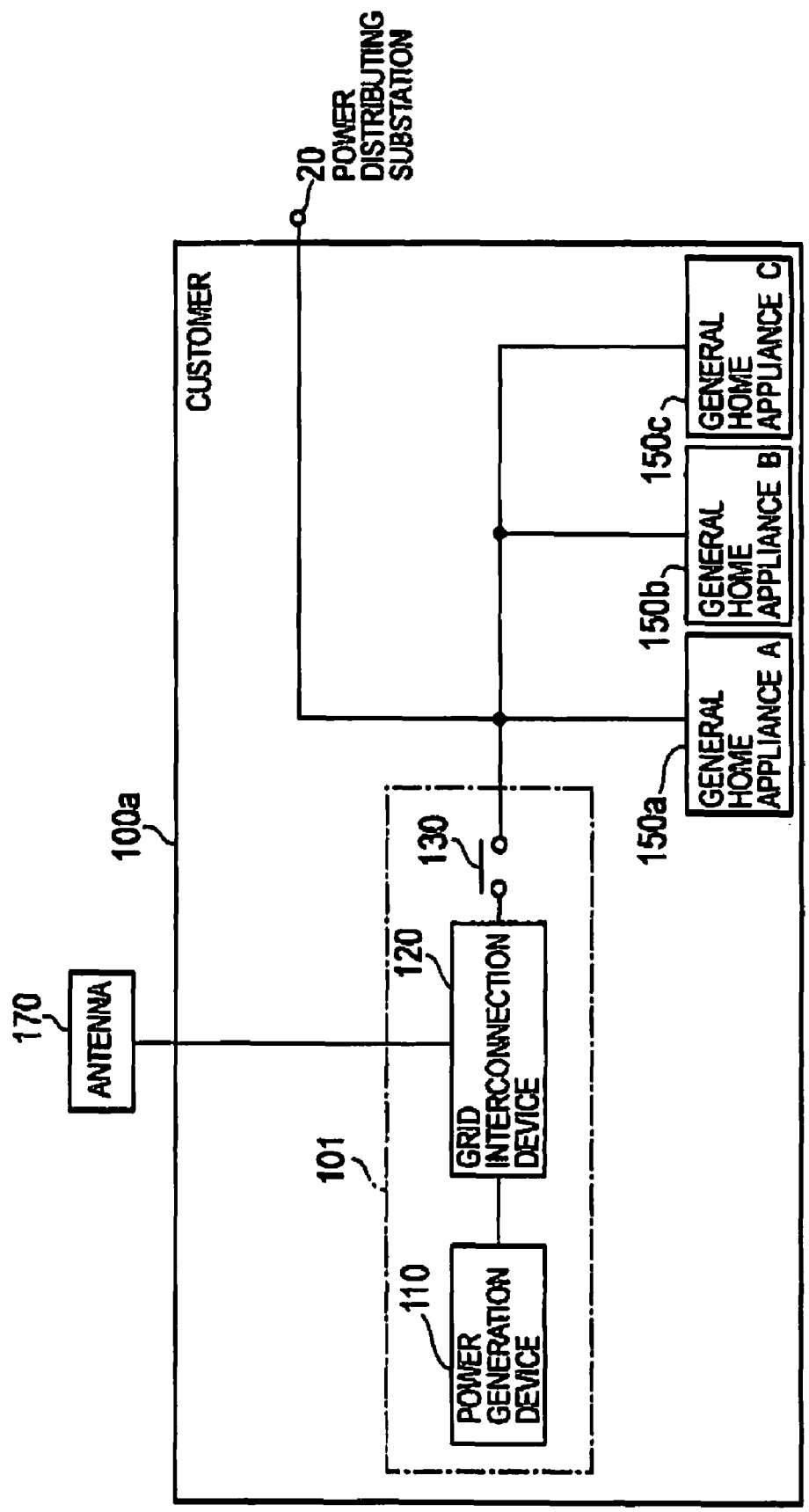
FIG. 2 is a functional block diagram showing a customer according to the embodiment.

The receiver 121 is configured to receive, from the transmission path, the power failure information on the bank 1 transmitted to an unspecified number of grid interconnection systems. Moreover, the transmission path is formed of a plurality of transmission paths, and the receiver 121 may receive the power failure information from each of the plurality of transmission paths, respectively. In FIGS. 2 and 3, the receiver 121 receives the power failure information wirelessly distributed through the antenna 170. Note that a way of receiving the power failure information is not limited to the above. As a matter of course, the power failure information may be received by use of the modem or the like.

The determination unit 123 is configured to determine, on the basis of the received power failure information, about whether or not there is a power failure in the bank 1 to which the power generation device is connected. For example, local area information of the bank 1 to which the grid interconnection system 101a belongs is stored in the storage unit 122, and the power failure information and the local area information stored in the storage unit 122 are checked against each other. If both information correspond to each other (if the local area information of the bank 1 is included in the power failure information), it is determined that there is a power failure in the bank 1. Furthermore, in the case where the receiver receives a plurality of pieces of power failure information, the determination unit 123 may determine that there is a power failure in the bank 1 to which the power generation device is connected if a predetermined number or more of pieces of the power failure information among the plurality of pieces of power failure information notify that power supply to the bank 1 is stopped. By increasing the number of paths to be determined, detection reliability is improved.

The storage unit 122 is configured to store the received power failure information, information on determination results obtained by the determination unit 123, the information of the area to which the grid interconnection system 101a belongs, and the like. Note that, as the storage unit 122, a storage device such as a RAM, a HD, a Flash Memory and a ROM may be used.

The detector 125 always uses a predetermined islanding detection method to detect an islanding state of the grid interconnection system 101a. Moreover, upon receipt of the information of whether or not the bank 1 is in a power failure state from the determination unit 128, the detector 125 detects the islanding state, if the bank 1 is in the power failure state, for example, by changing an output state of the grid interconnection system 101a for a predetermined period of time, by lowering a detection threshold or by using an islanding detection method different from the one normally used to increase detection accuracy.

The relay controller 126 is configured to control separation or interconnection of a relay between the inverter circuit 127 and the bank 1. Here, the separation of the relay means turn-off of a relay (the relay 180 in FIG. 2) which is positioned between the grid interconnection device 120 and the power distributing substation 20. Meanwhile, the interconnection of the relay means turn-on of the relay positioned between the grid interconnection device 120 and the power distributing substation 20. Moreover, based on the determination by the determination unit 123, the relay controller 126 performs separation control for the relay. Furthermore, the relay controller 126 may perform the separation control for the relay when the islanding state is detected by the detector 125.

When an active islanding detection method is used, the output controller 124 changes an output state outputted from the inverter circuit 127. The change in the output state means a change in an active variation amount. Although described in detail later, the change in the output state includes a change in, for example, a frequency shift amount, a variation amount (phase variation amount) of reactive power or active power, a variation amount of output power and a load variation amount, and the like. By increasing the above active variation amounts, detection sensitivity can be increased.

(Method for Controlling Grid Interconnection System)

Figure 4:
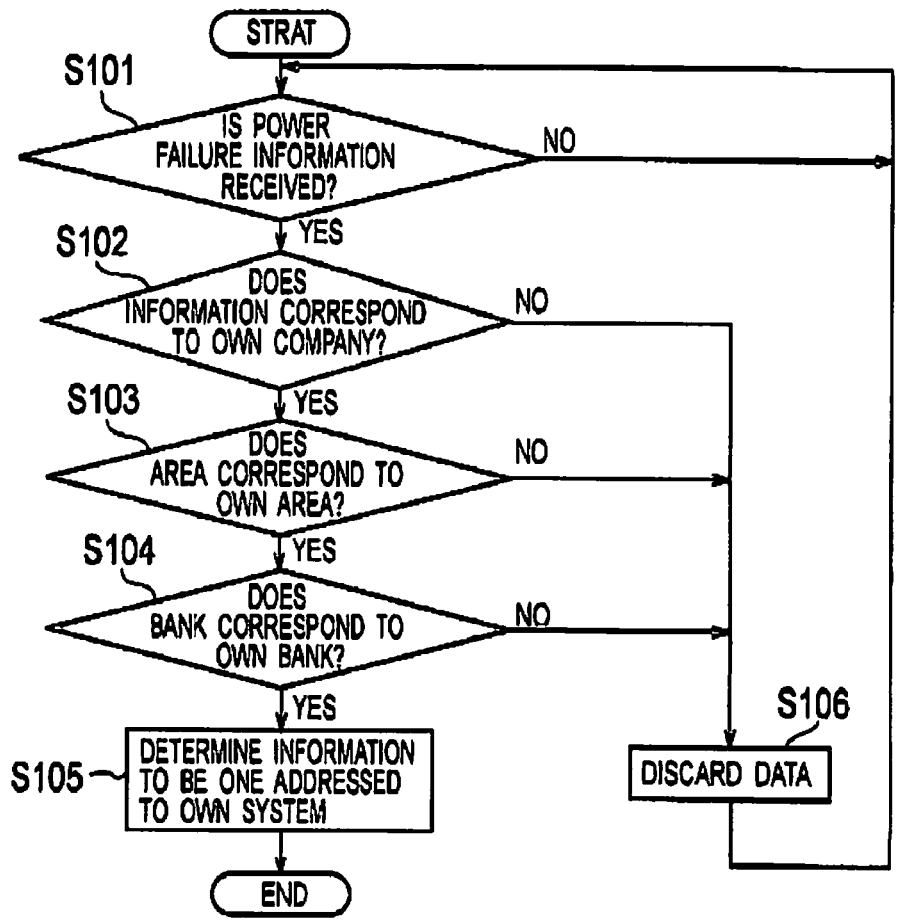
FIG. 4 is a flowchart (No. 1) showing a method for controlling a grid interconnection system according to the embodiment.

Next, with reference to FIG. 4, description will be given of a method for controlling the grid interconnection system 101a according to this embodiment. Note that the same control method is used for the grid interconnection systems 101b and 101c. FIG. 4 is a flowchart showing determination of whether or not received power failure information is information addressed to the grid interconnection system 101a. The determination is performed for each piece of power failure information received from a plurality of paths.

First, in Step S101, the receiver 121 in the grid interconnection system 101a checks if power failure information is received. If the power failure information is received, the processing advances to Step S102 where the determination unit 123 confirms contents of the power failure information to check if company information corresponds to a company related to the bank 1. If the company information corresponds to the company related to the bank 1, the processing advances to Step S103 where the determination unit 123 confirms the contents of the power failure information to check if an area in which a power failure occurs corresponds to an area of the bank 1. If the area corresponds to the area of the bank 1, the processing advances to Step S104 where the determination unit 123 confirms the contents of the power failure information to check if a bank in which the power failure occurs corresponds to the bank 1. If the bank corresponds to the bank 1, the processing advances to Step S105 where the determination unit 128 determines that the received power failure information is the information addressed to the grid interconnection system 101a.

Meanwhile, if NO in any of the determinations in Steps S101 to S104, the processing advances to Step S106 where the determination unit 123 discards the received power failure information data.

Next, with reference to FIG. 5, description will be given of a processing from reception of valid power failure information by the grid interconnection system 101a to separation of the power generation device.

First, in Step S201, the receiver 121 receives a plurality of pieces of power failure information from a plurality of paths and performs the processing shown in FIG. 4 to extract local area information of an area to which the grid interconnection system 101a belongs from the power failure information.

Next, in Step S202, the receiver 121 checks if the power failure information is received from all of the specified paths. If the power failure information is received, the processing advances to Step S204. Meanwhile, if the power failure information is not received from all the specified paths, the processing advances to Step S203 where the power failure information is received from each path until predetermined reception waiting time passes. When the predetermined reception waiting time has passed, the processing advances to Step S207. Thereafter, the processing is terminated. Next, in Step S204, the determination unit 123 determines on the basis of the plurality of pieces of power failure information whether or not there is a power failure in the bank 1. Here, the determination unit 123 determines that there is a power failure in the bank 1 to which the grid interconnection system 101a belongs if a predetermined number or more of pieces of the power failure information among the plurality of pieces of power failure information notify that power supply to the bank 1 is stopped. Moreover, in this event, detection reliability is improved by increasing the number of paths to be determined. Furthermore, the determination unit 128 may adopt only the information received from the specified path among the plurality of pieces of power failure information for the above determination. Moreover, the determination unit 123 may adopt, for the above determination, only the power failure information having specific information by confirming the contents of the power failure information.

When the determination unit 123 determines that there is a power failure in the bank 1, the detector 125 determines in Step S205 whether or not to change detection sensitivity of an islanding state. If the detection sensitivity is to be changed, the processing advances to Step S207. If the detection sensitivity is not to be changed, the relay controller 126 separates off the power generation device from the power distribution system in Step S206.

Meanwhile, in Step S207, the detector 125 performs islanding detection. If the islanding is detected in Step S208, the processing advances to Step S206 where the power generation device is separated from the power distribution system. If no islanding is detected in Step S208, the detector 125 increases the detection sensitivity in Step S209. Even in a situation where it is impossible to detect the islanding state despite the power failure when the power failure information is received, the islanding state can be detected accurately by increasing the detection sensitivity as described above. The situation where it is impossible to detect the islanding state includes a situation where the output from the grid interconnection system 101a and the load are matched within the bank 1. As a method for increasing the sensitivity, although described in detail later, there are a method for lowering a threshold, a method for increasing an active variation amount, and the like.

Subsequently, in Step S210, the detector 125 checks if an upper limit of the detection sensitivity is exceeded. If the upper limit is exceeded, an islanding detection error is issued in Step S211. Thereafter, the processing is terminated. Meanwhile, if the upper limit of the detection sensitivity is not exceeded, the processing returns to Step S207 to repeat the islanding detection.

Here, with reference to FIGS. 6 to 9, description will be given of the method for increasing the detection sensitivity in Step S209. FIGS. 6 to 8 show the case of an active islanding detection method for detecting the islanding state by increasing an active variation amount by a predetermined amount. A determination method for detecting the islanding state by increasing the active variation amount will be described. In the state where the output from the grid interconnection system 101a and the load are matched within the bank 1, a change in output power is absorbed toward the bank 1 with a normal active variation amount (disturbance), thereby making it difficult to detect the islanding state. Here, it is checked if there is a change in output power on the bank 1 by setting the active variation amount larger than the normal amount. If there is a change, it is possible to determine that the islanding state is present. Moreover, when the power supply from the bank 1 is not stopped, the disturbance is absorbed toward the bank 1 even if the active variation amount is increased. Thus, there is no change in the power on the bank 1.

(How to Increase Detection Sensitivity)

Hereinafter, description will be given of the cases of increasing a frequency shift amount (see FIGS. 6A and 6B), a phase variation amount (see FIGS. 7A and 7B) and a load variation amount (see FIG. 8) as the active variation amount.

Figure 6A:
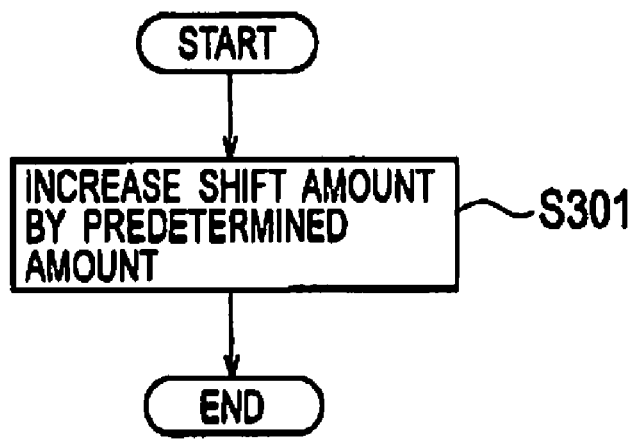
FIGS. 6A and 6B are views (No. 1) for explaining a method for increasing detection sensitivity in the method for controlling a grid interconnection system according to the embodiment.
Figure 6B:
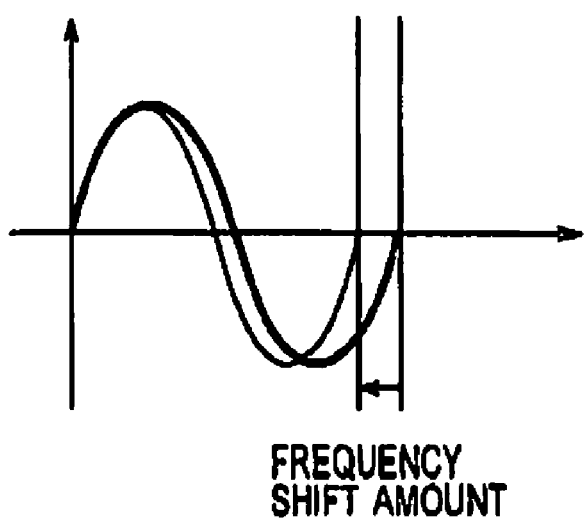

For example, in the case where the detector 125 uses a frequency shift method as the active islanding detection method, as shown in Step S301 of FIG. 6A and in FIG. 6B, the output controller 124 increases the frequency shift amount by a predetermined amount for a predetermined period of time. Note that the frequency shift method is a method for operating an inverter at a frequency lower or higher than a system frequency for example, a frequency lower or higher by about 0.1%) and for detecting a frequency change in the islanding state. Here, when there is a frequency change in an output on the power distribution system by setting the shift amount larger than a normal amount, the islanding state can be detected.

Figure 7A:
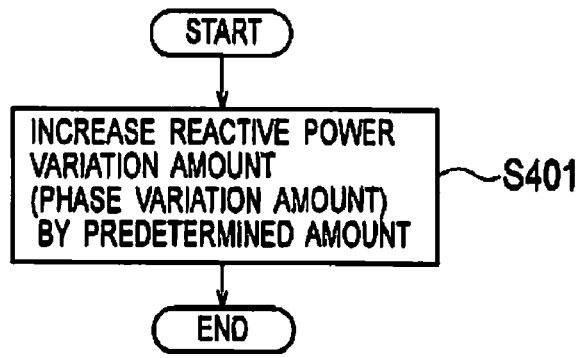
FIGS. 7A and 7B are views (No. 2) for explaining the method for increasing detection sensitivity in the method for controlling a grid interconnection system according to the embodiment.
Figure 7B:
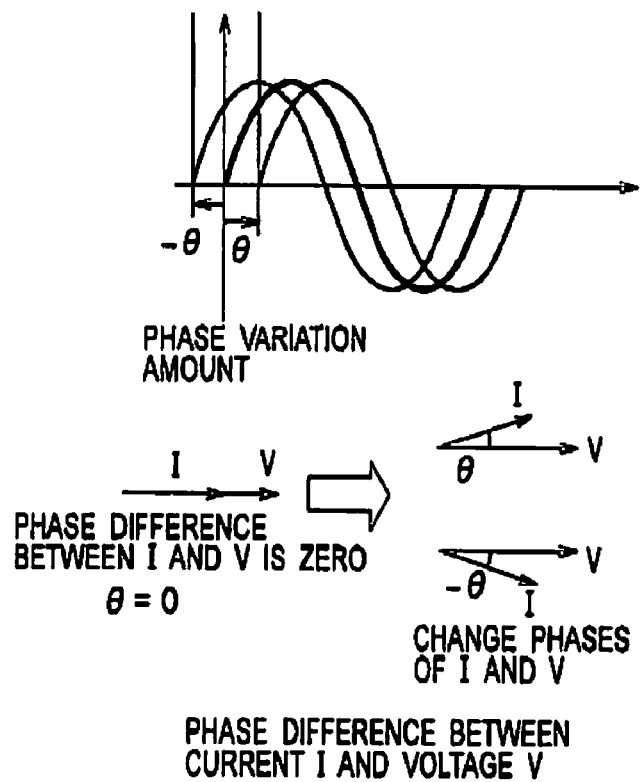
Figure 8:
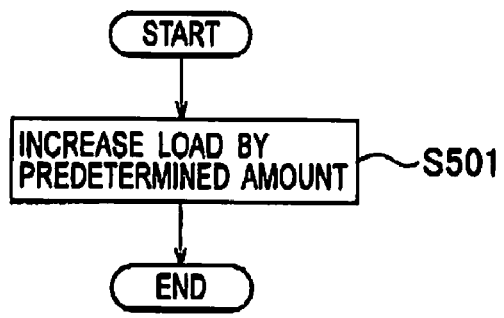
FIG. 8 is a view (No. 3) for explaining the method for increasing detection sensitivity in the method for controlling a grid interconnection system according to the embodiment.

Moreover, in the case where the detector 125 uses a reactive power variation method as the active islanding detection method, as shown in Step S401 of FIG. 7A and in FIG. 7B, the output controller 124 may increase a reactive power variation amount (phase variation amount) by a predetermined amount for a predetermined period of time. Note that the reactive power variation method is a method for making a minute change in output reactive power of the inverter or the power generation device and for detecting a change in a frequency or a current in the islanding state. Similarly, in the case where the detector 125 uses an active power variation method as the active islanding detection method, the output controller 124 may increase an active power variation amount for a predetermined period of time. Note that the active power variation method is a method for making a minute change in output active power of the inverter and for detecting a change in a frequency or a voltage in the islanding state.

Moreover, in the case where the detector 125 uses a load variation method as the active islanding detection method, as shown in Step S501 of FIG. 8, the output controller 124 may increase a load variation amount by a predetermined amount for a predetermined period of time. Note that the load variation method is a method for inserting a small load installed outside the inverter or the power generation device into the system for a short time in a constant period and detecting a change in a voltage or a current which corresponds to an insertion period. Here, when there is a change in the voltage or the current of the output on the power distribution system by setting the load larger or smaller than a normal one to increase the load variation amount, the islanding state can be detected.

Figure 9:
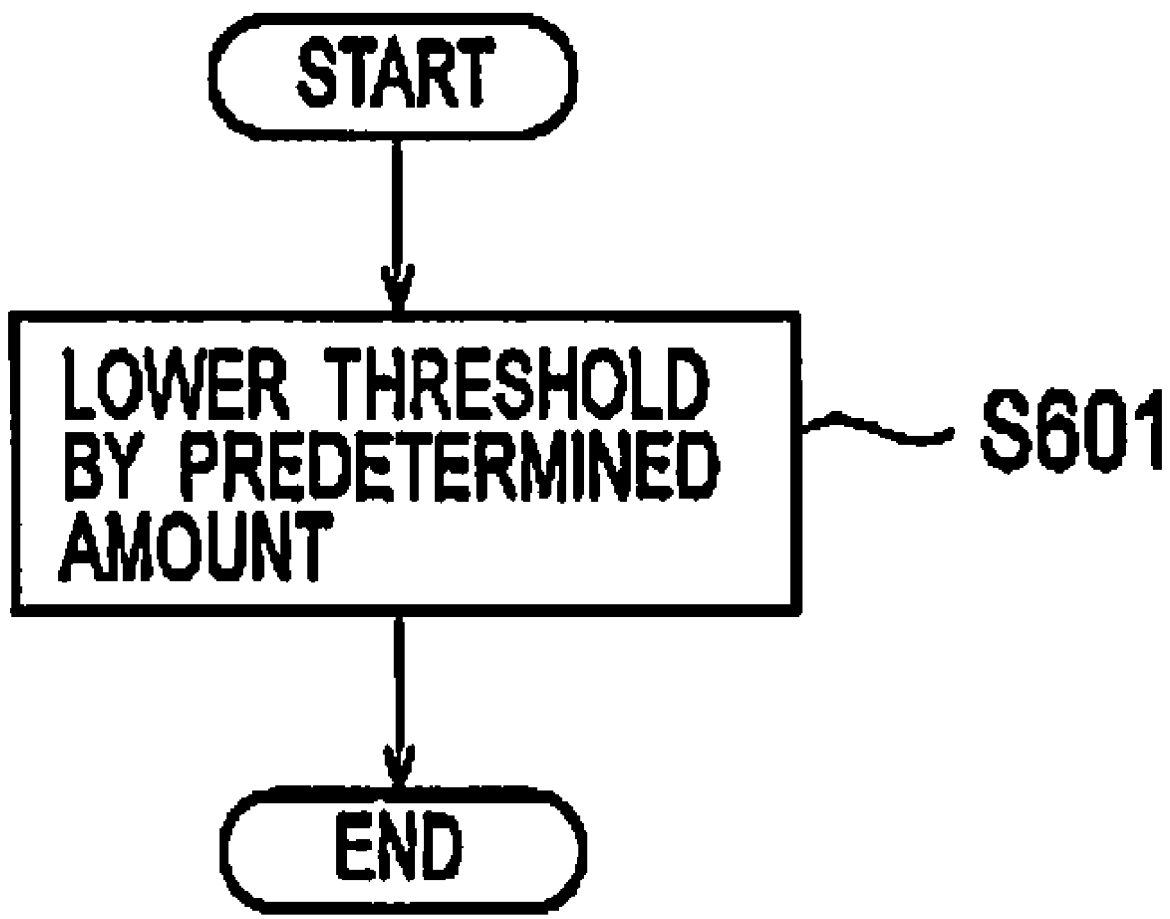
FIG. 9 is a view (No. 4) for explaining the method for increasing detection sensitivity in the method for controlling a grid interconnection system according to the embodiment.

Moreover, in the case where the detector 125 uses the active or passive islanding detection method, as shown in Step S601 of FIG. 9, the output controller 124 may increase the detection sensitivity of the detector 125 by lowering a detection threshold for a predetermined period of time. Note that the passive islanding detection method includes a voltage phase jump detection method, a third-harmonic voltage distortion upsurge detection method, a frequency change rate detection method, and the like. The voltage phase jump detection method is a method for detecting a sudden change amount in a phase of a system voltage when shifting from the interconnection state to the islanding state. The third-harmonic voltage distortion upsurge detection method is a method for detecting a sudden change amount in distortion of a system voltage when shifting from the interconnection state to the islanding state. The frequency change rate detection method is a method for detecting a sudden change amount in a system frequency of a system voltage when shifting from the interconnection state to the islanding state.

Here, even in a state where an output from the grid interconnection system and a load are matched within the power distribution system, respective detection parameters in the passive islanding detection method vary although not noticeable in the islanding state. For example, the respective detection parameters chase, third-harmonic distortion factor and frequency change rate) used in the voltage phase jump detection method, the third-harmonic voltage distortion upsurge detection method and the frequency change rate detection method vary. Therefore, even if the detection cannot be performed with a normal detection threshold in each of the above methods, a detectable level can be improved by lowering the detection threshold. Moreover, the same goes for the active islanding detection method. Even in the case of a normal variation amount, when the islanding state is set in a situation where the output from the grid interconnection system and the load are matched within the power distribution system, the respective detection parameters vary although not noticeable. Accordingly, in order to detect the variation, the detection threshold is lowered.

Figure 10A:
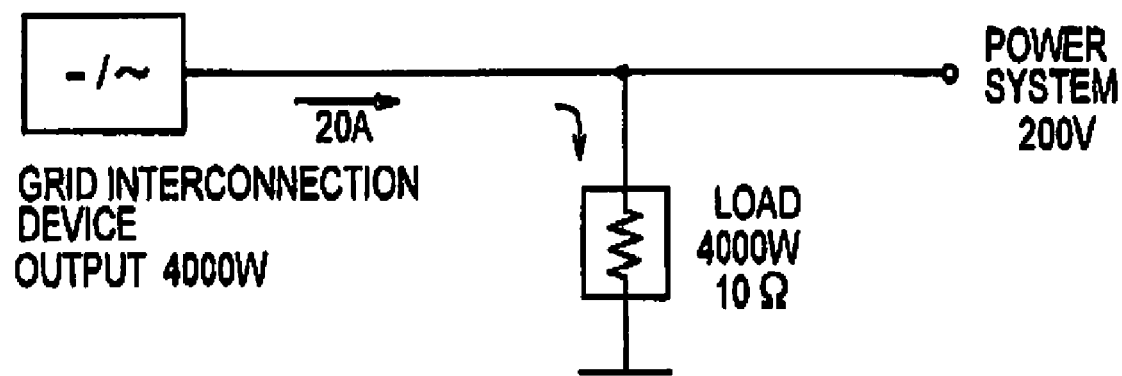
FIGS. 10A and 10B are views (No. 5) for explaining the method for increasing detection sensitivity in the method for controlling a grid interconnection system according to the embodiment.
Figure 10B:
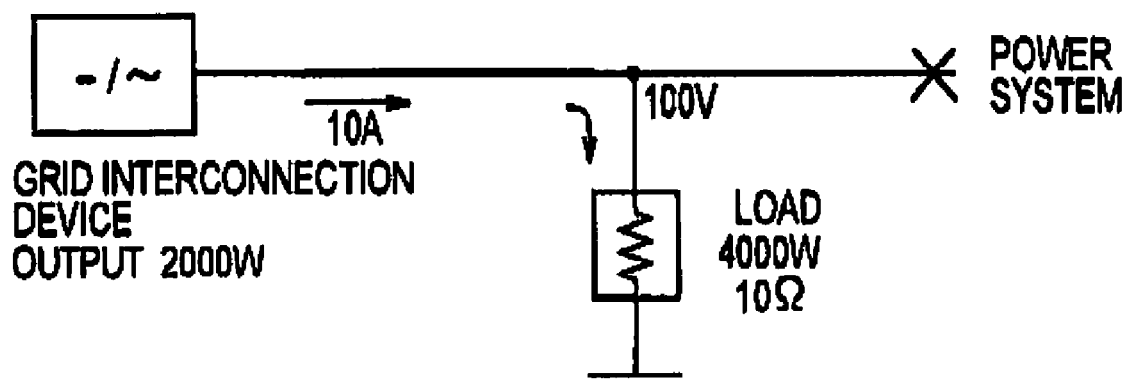

Furthermore, the output controller 124 may significantly reduce the output power to the power distribution system from the power generation device for a predetermined period of time and the detector 125 may detect an undervoltage. Thus, the islanding state can be detected. For example, as shown in FIG. 10A, operations are assumed to be performed in a state where an output of the grid interconnection device is 4000 W and a voltage of the power system is 200V. Since an output voltage of the grid interconnection device is 200V, which is the same as that of the power system, an output current is set to 20 A. Here, for simplicity of description, a load is set equal to a resistance. In this case, when the load is 4000 W, 200V is applied to allow a current of 20 A to flow. Thus, a resistance value of the load is set to 10Ω. Here, as shown in FIG. 10B, when it is assumed that there is a power failure in the power system and the output from the grid interconnection device is reduced to, for example, 2000 W, the output current is set to 10 A (ampere). Thus, the power of 10 A flows through the load having the resistance of 10Ω. As a result, the output voltage is set to 100V. Meanwhile, the voltage value on the system side is monitored on the grid interconnection device side and is determined to be abnormal when the output voltage is changed. Therefore, in the above state, abnormality is detected by detecting reduction in the voltage and thus the islanding state can be detected. Moreover, even in the state where the output from the grid interconnection system and the load are matched within the power distribution system, when the output to the power distribution system from the power generation device is significantly reduced in the islanding state, there arises a change in the phase of the current or the voltage since the load under the power distribution system has impedance characteristics. The islanding state may be detected by detecting this phase change.

(Operations and Effects)

The grid interconnection device according to this embodiment makes it possible to determine whether or not there is a power failure in the power distribution system to which the power generation device is connected on the basis of the power failure information of the power distribution system, which is received from the transmission path and transmitted to an unspecified number of systems, particularly, the local area information and also to perform separation control for the relay. The use of the power failure information transmitted to the unspecified number of systems, particularly, the local area information as described above makes it possible to separate the power generation device in the customer from the power distribution system by notifying the grid interconnection system of the power failure information without requiring an enormous amount of information such as information of individual power generation devices even if the number of power generation devices to be connected is increased while suppressing adverse effects on other devices connected to the power distribution system when the power supply from the power distributing substation is stopped.

Moreover, the transmission path is formed of a plurality of transmission paths, the receiver 121 receives the power failure information through the plurality of transmission paths, respectively, and the determination unit 123 can determine whether or not there is a power failure in the power distribution system to which the power generation device is connected on the basis of the power failure information received from the plurality of transmission paths, respectively. Thus, by receiving the power failure information from the plurality of transmission paths, the power failure information can be received even if abnormality is caused in a part of the transmission paths. Consequently, it is possible to determine that there is a power failure in the power distribution system to which the power generation device is connected.

Moreover, the grid interconnection device 120 includes the detector 125 configured to detect the islanding state. When the determination unit 123 determines that there is a power failure in the power distribution system, the detector 125 increases the detection sensitivity. When the detector 125 detects the islanding state, the relay controller 126 can perform the separation control for the relay. By increasing the detection sensitivity as described above, accuracy of detecting the islanding state can be further improved. Moreover, accuracy of detecting the power failure can be improved even if erroneous information is included.

Moreover, the detector 125 can increase the detection sensitivity by lowering the detection threshold. The increase in the detection sensitivity as described above enables further improvement in the accuracy of detecting the islanding state.

Moreover, the grid interconnection device 120 includes the output controller 124 configured to change the output state of the power outputted from the inverter circuit 127. The output controller 124 can increase the detection sensitivity of the detector by increasing the active variation amount. The increase in the detection sensitivity as described above enables further improvement in the accuracy of detecting the islanding state.

Moreover, the detector 125 may use other islanding detection methods in addition to the normally used islanding detection method. When the determination unit 123 determines that there is a power failure in the power distribution system, the other islanding detection method may be used in addition to the normally used islanding detection method to detect the islanding state. In this case, the relay controller performs the separation control for the relay also in the case where the islanding state is detected by use of the other islanding detection method. By simultaneously using different islanding detection methods as described above, the detection sensitivity of the detector 125 can be increased. Thus, the accuracy of detecting the islanding state can be further improved.

Moreover, if the detector 125 increases the detection sensitivity, the detection sensitivity can be set back to that before being increased after a lapse of predetermined time. Thus, in a normal operation, the accuracy of detecting the islanding state can be improved while suppressing adverse effects on the system or erroneous detection.

Other Embodiments

The present invention has been described based on the foregoing embodiment. However, it should be understood that the present invention is not limited to the description and drawings which constitute a part of this disclosure. From this disclosure, various alternative embodiments, examples and operational technologies will become apparent to those skilled in the art.

Figure 5:
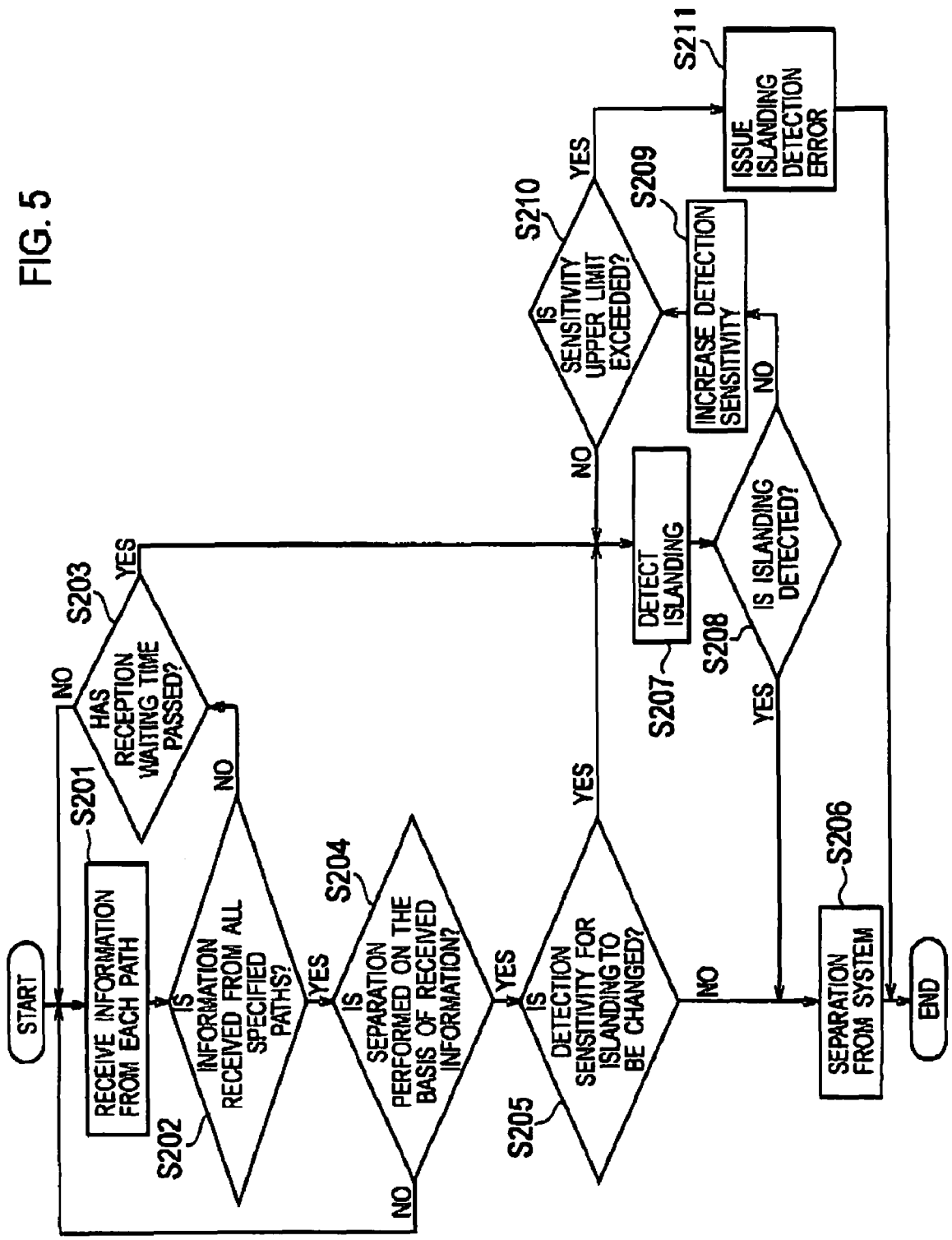
FIG. 5 is a flowchart (No. 2) showing the method for controlling a grid interconnection system according to the embodiment.

For example, in FIG. 5 in this embodiment, the detection sensitivity of the islanding state is changed when it is determined to perform the separation on the basis of the power failure information (Steps S204 and S205). However, for example, when it is determined to perform the separation on the basis of the power failure information, the separation from the system may be immediately performed. Specifically, the processing may advance to Step S206 by selecting NO in Step S205. Moreover, even if it is determined not to perform the separation on the basis of the power failure information, the detection sensitivity of the islanding state may be increased when certain conditions are satisfied. The certain conditions include, for example, the case where there is even one notification of a power failure, the case where there is a notification of a power failure from a specified path, and the like.

Moreover, the receiver 121 may make a request to a source of the power failure information for information concerning the received power failure information. The contents of the request include, for example, a request for retransmission of the power failure information, a request for detailed information of the power failure information, viewing of the power failure information disclosed by the source, and the like. Note that the request for the information concerning the power failure information is made by use of means that can access the power distribution system from the grid interconnection system, such as the Internet, a telephone network, a dedicated line, power line communication and packet communication network. By making a request for the information concerning the received power failure information to the source of the power failure information as described above, it is possible to make an inquiry about the contents of the received power failure information. Thus, it is possible to check the authenticity of the power failure information.

Moreover, although the inverter circuit is used as the power conversion device, the present invention is not limited thereto. For example, when the power generation device generates alternating-power as in the case of wind power generation, a power conversion device which directly converts the alternating-power into predetermined alternating-power, such as a cycloconverter or a matrix converter, may be used.

As described above, it is a matter of course that the present invention includes various embodiments and the like which are not described here. Therefore, the technical scope of the present invention is defined only by items specifying the invention, which are according to the scope of claims reasonable from the above description.

What is claimed is:

1. A grid interconnection device including a power conversion circuit for converting power from a power generation device into predetermined alternating-power, and connecting the power generation device to a power distribution system through the power conversion circuit and a relay, comprising:
    a relay controller configured to control separation or interconnection of the relay;
    a receiver configured to receive, from a predetermined transmission path, power failure information containing at least local area information indicating an area in which a power failure occurs;
    a determination unit configured to determine an occurrence of a power failure in the power distribution system, when the power failure information includes local area information of an area to which the power distribution system belongs; and
    a detector configured to detect an islanding state, wherein
    the detector increases detection sensitivity of the islanding state when the determination unit determines the power failure occurs in the power distribution system, and
    the relay controller performs separation control for the relay when the islanding state is detected by the detector.

2. The grid interconnection device according to claim 1, wherein
    the predetermined transmission path is formed of a plurality of transmission paths,
    the receiver receives the power failure information through each of the plurality of transmission paths, and
    the determination unit determines whether or not the power failure occurs in the power distribution system, on the basis of the power failure information received from each of the plurality of transmission paths.

3. The grid interconnection device according to claim 1, wherein the receiver makes a request to a source of the power failure information for information concerning the power failure information.

4. A grid interconnection system comprising:
    a power generation device; and
    the grid interconnection device according to claim 1.

5. A transfer trip system comprising a power distributing substation and a grid interconnection system, which are connected to each other through a power distribution system, wherein
    the power distributing substation includes a transmitter configured to transmit, to the grid interconnection system, through a predetermined transmission path, power failure information containing at least local area information indicating an area in which a power failure occurs,
    the grid interconnection system comprises:
    a power generation device configured to generate power;
    a power conversion circuit configured to convert the power from the power generation device into predetermined alternating-power;
    a relay configured to switch between separation and interconnection of the power generation device to and from the power distribution system;
    a relay controller configured to control separation or interconnection of the relay;
    a receiver configured to receive, from the predetermined transmission path, the power failure information;
    a determination unit configured to determine an occurrence of a power failure in the power distribution system, when the power failure information includes local area information of an area to which the power distribution system belongs; and
    a detector configured to detect an islanding state; wherein
    the detector increases detection sensitivity of the islanding state when the determination unit determines the power failure occurs in the power distribution system; and
    the relay controller performs separation control for the relay when the islanding state is detected by the detector.

* * * * *